United States Patent
Breneman et al.

(10) Patent No.: US 9,487,721 B2
(45) Date of Patent: Nov. 8, 2016

(54) REFINED TORREFIED BIOMASS

(75) Inventors: William C. Breneman, Moses Lake, WA (US); David T. Carter, Brush Prairie, WA (US); Howard J. Dawson, Anacortes, WA (US); Andrew J. Green, Salem, OR (US); Hiroshi Morihara, Gresham, OR (US); Richard F. Palmer, Camas, WA (US)

(73) Assignee: HM3 Energy, Inc., Gresham, OR (US)

( * ) Notice: Subject to any disclaimer, the term of this patent is extended or adjusted under 35 U.S.C. 154(b) by 530 days.

(21) Appl. No.: 14/007,580

(22) PCT Filed: Mar. 21, 2012

(86) PCT No.: PCT/US2012/029890
§ 371 (c)(1),
(2), (4) Date: Sep. 25, 2013

(87) PCT Pub. No.: WO2012/134907
PCT Pub. Date: Oct. 4, 2012

(65) Prior Publication Data
US 2014/0013661 A1  Jan. 16, 2014

Related U.S. Application Data

(60) Provisional application No. 61/467,550, filed on Mar. 25, 2011.

(51) Int. Cl.
| | | |
|---|---|---|
| *C10L 5/00* | (2006.01) | |
| *C10L 5/44* | (2006.01) | |
| *C10L 5/36* | (2006.01) | |
| *C10L 9/08* | (2006.01) | |
| *B09C 1/00* | (2006.01) | |
| *F23J 15/02* | (2006.01) | |

(52) U.S. Cl.
CPC .................. *C10L 5/447* (2013.01); *B09C 1/00* (2013.01); *C10L 5/361* (2013.01); *C10L 9/083* (2013.01); *F23J 15/025* (2013.01); *Y02E 50/10* (2013.01); *Y02E 50/15* (2013.01); *Y02E 50/30* (2013.01)

(58) Field of Classification Search
CPC ........ C10L 5/447; C10L 5/361; C10L 9/083; B09C 1/00; F23J 15/025; Y02E 50/15; Y02E 50/30; Y02E 50/10
See application file for complete search history.

(56) References Cited

U.S. PATENT DOCUMENTS

| | | |
|---|---|---|
| 2,679,316 A | 3/1950 | Ruepp |
| 4,057,398 A | 11/1977 | Bennett et al. |
| 4,372,227 A | 2/1983 | Mahoney et al. |
| 4,486,300 A | 12/1984 | Prieb |
| 4,553,978 A | 11/1985 | Yvan |
| 4,787,917 A | 11/1988 | Leclerc de Bussy |
| 4,816,572 A | 3/1989 | Bourgeois |
| 4,915,824 A | 4/1990 | Surtees |
| 4,954,620 A | 9/1990 | Bourgeois |
| 5,829,597 A | 11/1998 | Bielagus |
| 5,894,806 A | 4/1999 | Smyrniotis et al. |
| 2003/0221363 A1 | 12/2003 | Reed |
| 2008/0223269 A1 | 9/2008 | Paoluccio |
| 2008/0271657 A1 | 11/2008 | Cross |
| 2009/0178599 A1 | 7/2009 | Pastore et al. |
| 2010/0092365 A1 | 4/2010 | Shipley |
| 2010/0281759 A1 | 11/2010 | Yanik et al. |
| 2010/0287826 A1 | 11/2010 | Hoffman et al. |
| 2010/0304440 A1 | 12/2010 | Medoff |

FOREIGN PATENT DOCUMENTS

| | | |
|---|---|---|
| GB | 2 448 531 | 10/2008 |
| WO | WO 2009/143017 | 11/2009 |
| WO | WO2011135305 | * 11/2011 |

OTHER PUBLICATIONS

Bergman et al., "Torrefaction for biomass upgrading," published at the 14th European Biomass Conference & Exhibition, Paris, France, Oct. 17-21, 2005 (7 pages).
International Search Report from International Application No. PCT/US2012/029890 dated Jun. 20, 2012.

* cited by examiner

*Primary Examiner* — Cephia D Toomer
(74) *Attorney, Agent, or Firm* — Klarquist Sparkman, LLP

(57) ABSTRACT

A manufacturing process is disclosed for preparing torrefied biomass having a reduced inorganic content which comprises passing crude torrefied biomass through one or more selective separation devices capable of separating inorganic particulate matter from the torrefied biomass.

21 Claims, No Drawings

REFINED TORREFIED BIOMASS

CROSS REFERENCE TO RELATED APPLICATION

This is the U.S. National Stage of International Application No. PCT/US2012/029890, filed Mar. 21, 2012, which was published in English under PCT Article 21(2), which in turn claims the benefit of the earlier filing date of U.S. provisional patent application No. 61/467,550, filed on Mar. 25, 2011, both of which are incorporated herein by reference in their entirety.

FIELD

This invention relates to a refined torrefied biomass having reduced inorganic matter content; a process for the manufacture thereof; and use thereof in the production of energy.

BACKGROUND

In the field of power generation, a significant amount of electricity is generated by burning of fossil fuels and especially coal.

One of the major problems associated with burning coal is the issue related to inorganic materials in the coal. Coal after combustion can leave amounts of ash of as high as 10 weight percent. The ash is essentially inorganic matter. The inorganic matter causes problems in slagging and fouling of the furnaces; see for example, the teachings of U.S. Pat. Nos. 4,372,227 and 5,894,806; and U.S. patent publication No. 2004/022928. Slagging is defined as the deposition of fly ash on the heat transfer and refractory surfaces in the furnace volume that is subjected to radiant heat transfer. Fouling is defined as a deposition in the heat recovery section of the steam generator mainly due to convective heat exchange by fly ash quenched to a temperature below its melting point. Compounds, mainly inorganic, that have vaporized in the combustion zone can and will condense on the heat transfer surfaces by condensation of the volatiles or by the sulphation of $SO_3$ which is formed by oxidation of the sulfur components in coal. Depending on the amount of deposition, they can significantly impact the efficiency of the furnace. Besides the combustion conditions, the deposits formed depend mainly on the release and chemistry of the chlorine, sulphur, aluminum silicates and alkali metals during combustion. Various solutions to the issue have been proposed; see for example, the teachings of U.S. Pat. Nos. 4,057,398 and 4,372,227; and patent publication Nos. 2004/022928, 2008/0271657, and 2009/0178599. However, controlling and reducing the deposits which cause slagging and fouling remains a major issue in efficient operation of coal fired plants.

Consequentially, the continued use of coal in this manner is becoming increasingly complicated as more stringent environmental rules and regulations with respect to sulphur emissions, heavy metal disposal and carbon footprint are implemented.

SUMMARY

In the desire to comply with such environmental demands, torrefied biomass becomes a favorable substitute candidate for fossil fuels due to it being a renewable energy source of good calorific content and having essentially a carbon-neutral profile relative to fossil fuels. However, combustion of torrefied biomass is also known to result in elevated amounts of ash. Accordingly, it is desirable to reduce the inorganic content of torrefied biomass, especially that which might be obtained from forest residue, prior to its use and combustion as fuel. In addition to reducing net carbon dioxide generation, a further objective to replacing coal as a primary fuel source with torrefied biomass is to advantageously mitigate the other issues of fossil fuel, including the fouling, sulfur emissions, and release of heavy metals such as mercury, while retaining the advantages of a fuel which is an easily transportable, environmentally stable solid fuel which is easily pulverized to promote rapid and complete combustion. Other alternatives to torrefied wood are biochar, which is obtained by the controlled pyrolysis and carbonization of biomass at temperatures above 325° C.

Torrefied biomass differs from biochar in that it is obtained by treatment of the biomass at temperature up to about 280° C. and without onset of the pyrolysis, thus avoiding the formation of biochar and wood ash. The process of torrefaction of wood is known to liberate and release a substantial amount of inorganic particulate matter, dirt, from the surface of biomass and especially from woody biomass containing bark and forest floor debris. Bark contains dirt often trapped and encapsulated in the biomass, which is released on torrefaction. Accordingly, there is a need to establish ways of removing the inorganic content of torrefied biomass, especially that sourced from wood or forest floor debris, prior to its use as a fuel for power generation or carbon source for other industrial processes such as biofuels or syn gas generation.

Crude woody biomass consists of materials which are left-over from the harvest of whole trees. When whole trees are harvested, the limbs, butt ends and short lengths of tree stems are removed from the trunk of the tree. These low valued materials are generally left in the forest in the form of "slash" and are burned after a season of drying. Of course burning the slash piles contributes to a great deal of harmful air pollution in the form of partially burned, volatile organic compounds, ash and smoke. Harvesting these slash piles before they are burned constitutes one form of "crude" woody biomass. Other forms are so-called scrub vegetation and invasive species which are removed to increase the health of forest lands. All of these materials are characterized as containing high levels of bark, leaves, needles, and dirt which is picked up from the forest floor as result of the harvesting operation. Washing the crude biomass can be used to remove the dirt and ash-forming inorganic contamination. This transfers the contamination to the water as a slurry of fine particles and dissolved salts. Washing is an unsatisfactory solution as the method delivers a washed biomass containing high levels of water for which a great amount of energy is required to dry prior to torrefaction. Furthermore, the water used for washing is contaminated with soluble salts, silt and dirt components and thereby requires complicated and expensive purification methods to be employed prior to discharge.

If torrefied biomass is prepared from whole trees which are debarked to remove the primary source of ash producing contaminants, the refined biomass can have a low residual ash content, but the cost of debarking is relatively high and the fuel value of the discarded bark is also lost. Furthermore, the additional cost of chipping the whole tree is much higher than the effort to reduce the limbs, and short trunks of the slash materials to a size appropriate for processing into refined torrified biomass and briquettes.

Thus there remains a need to produce, by a viable and economically attractive manner, a low ash content torrefied biomass from forest material and especially from forest material comprising what is otherwise a waste material (slash).

In one aspect, disclosed is a manufacturing process for refined torrefied biomass having a reduced inorganic content which comprises passing crude torrefied biomass through one or more selective separation devices capable of separating inorganic particulate matter from the torrefied biomass.

In another aspect, disclosed is a process for preparing a refined torrefied biomass having a reduced inorganic matter content which comprises passing granulate torrefied biomass sourced from non-debarked forest wood and forest debris through a fluidized bed separator to separate larger particle granulate torrefied biomass from smaller inorganic particles.

In yet another aspect, disclosed is a refined torrefied biomass characterized in that it has an inorganic matter content reduced by from about 10 to about 90 weight percent relative to non-refined, crude torrefied biomass sourced from the same green material and same torrefaction process and wherein the refinement is effected by subjecting, post-torrefaction, the biomass to a selective separation process to remove inorganic matter.

In yet another aspect, disclosed is a compacted biomass material having a reduced inorganic matter content manufactured by subjecting the refined torrefied biomass to a subsequent briquetting process.

In yet another aspect, disclosed is a process for the generation of energy by combustion of solid fuel with reduced inorganic ash generation said process comprising the use of a refined torrefied biomass, such as disclosed above, as the solid fuel thus providing for a concomitant reduction in generation of inorganic ash.

In yet another aspect, disclosed is a method to reclaim the energy value of fine particulate biomass which is recovered from the dirt removal process by combustion of the dirt containing fine particulate biomass in a method whereby the non-combustible fraction is subsequently removed from the combustion products using a filter.

In yet another aspect, disclosed is a method to reclaim economic value from the dirt containing fine particulate biomass which is recovered from the dirt removal process through its use as a soil enhancement adjuvant for agricultural use.

This disclosures herein provides a refined torrefied biomass with reduced inorganic matter content and concomitant advantages to reduced fouling of equipment when used as a substitute for solid fossil fuel in devices designed to burn powdered, briquetted or pelletized solid fuel such as power station furnaces cement kilns, home heating pellet stoves and the like.

DETAILED DESCRIPTION

Torrefaction of biomass in summary comprises subjecting a biomass to temperatures of from about 200° C. to about 280° C., more typically from about 240° C. to about 280° C., in an essentially oxygen free environment for an effective period of time, which typically is from about 1 to about 15 minutes. Exposure to temperatures above 280° C. causes onset of pyrolysis and diminishes the calorific value of the resulting biomass. Methods of torrefaction of biomass are known and illustrated by the teachings of documents including U.S. Pat. Nos. 4,553,978, 4,787,917, 4,816,572, and 4,954,620; and U.S. patent publications 2003/0221363A1, and 2008/0223269A1, all of which are incorporated herein by reference.

Biomass subjected to torrefaction can come from a variety of agricultural and natural resources; however, the principle and preferred sources are forest products and forest debris and include a variety of wood types and typically are non-debarked.

Disclosed embodiments of the present invention are particularly suited to the treatment of crude torrefied biomass obtained from forest wood and wherein the torrefaction process has been carefully controlled to avoid any real onset of pyrolysis and biochar formation. That is, the torrefied biomass is substantially free of biochar and the concomitant wood ash. Biochar has a porosity that can trap moisture on storage and hence diminishes its performance as fuel in the power stations; in contrast, torrefied biomass is hydrophobic and does not pick up water on long term storage.

In accordance with certain disclosed embodiments, the so obtained "crude" torrefied biomass is refined to reduce its inorganic matter content by passing it through at least one selective dry separation device which is capable of separating particulate inorganic matter from torrefied biomass. Combinations of two or more devices can also be beneficial. Suitable selective separation devices include a vibrating mesh sieve, a fluidized bed separator, a cyclone, an air separator or an air knife. Such devices are well known to a person or ordinary skill in the art and are well documented in the open and technical literature and need not be further described. Preferred separation devices include a vibrating mesh sieve, also known as an oscillating mesh bed, or optionally, an air separator device because of relative simplicity in operation.

When a vibrating mesh sieve is utilized, it will have a Tyler mesh size of between 6 and 16 (3.4 mm and 1.0 mm) or preferably between Tyler size 8 and 14 (2.4 mm and 1.4 mm) or most preferably between Tyler size 10 and 14 (1.6 mm and 1.2 mm. Torrefied biomass typically has a particle size greater than this while inorganic matter is usually a fine particulate with average particle size below 1.6 mm.

The principle of an air separator is to separate dust or fine particles from larger comminuted particles on the basis of relative air density. This is understood better with reference to U.S. Pat. Nos. 2,679,316, 4,486,300, 4,915,824 and 5,829,597, all incorporated herein by reference.

An air knife is a tool used to blow off debris from products as they travel on conveyors. The knife consists of a high intensity, uniform sheet of laminar airflow sometimes known as streamline flow. The high localized air flow carries away particles which are of smaller aerodynamic size. When combined with an air separator, it is possible to separate a flow of torrefied woody biomass into multiple separate sized fractions. For example, the fraction above about 12 mm cross-section passes through the unit unchanged, but this fraction contains a minor amount of the ash forming contaminants. The size fraction below about 12 mm and greater than about 1.6 mm is removed. From our observations, typically this size fraction contains about 75% of the ash contributing contamination, while constituting about 50% of the mass of the torrefied biomass. The size fraction constituted in the about 1.6 m to 12 mm fraction is processed through an air density separator where the higher density inorganic material is separated from the lower density torrefied woody biomass.

Prior to passing the torrefied biomass through the selective separation device optionally it is subjected to a comminuting process to confer an essentially uniform granulate particle size to the torrefied biomass. This facilitates operation of the selective separation device and collecting/handling of the biomass. It also ensures that the inorganic matter is fully liberated and capable of being separated from the biomass. Typically, the comminuting process consists of subjecting the torrefied biomass to a pulverizing, triturating, milling or sonification treatment.

The refined torrefied biomass as obtained according to disclosed embodiments of the present invention has a reduced inorganic matter content as evidenced by measurement on combustion of the material. The reduction in inorganic matter typically is from about 10% or greater, preferably from about 20% and greater and up to 90%, and preferably up to at least 70% weight percent. Ligno-cellulosic materials have a natural inorganic content and thus there will always be a small inorganic matter content on combustion even with a highly efficient removal of the inorganic dirt using a selective separation device.

Accordingly it is to be appreciated that the refined torrefied biomass obtained according to disclosed embodiments of the process cannot have an inorganic content less than the natural inherent content of the biomass. Natural residual inorganic content of biomass can vary depending on source of the biomass; for example, clean lumber wood such as might be used in house construction of furniture on total combustion is noted as having an inorganic ash content of usually significantly less than 2 percent by weight. Accordingly it is to be appreciated that the refined torrefied biomass obtained according to the process disclosed herein cannot have an absolute inorganic content less than the natural inherent content of the biomass.

To facilitate the subsequent handling, transportation or storage of the refined torrefied biomass it advantageous to subject it to a compaction process and present the material in a densified format, such as, for example, a briquette or a pellet. Compaction of materials to give densified forms such as a briquette is known and exemplified by methods such as disclosed in the patent publication GB 2,448,531, which is incorporated herein by reference.

During the process of refining the crude torrefied biomass and reduction of its inorganic content, Applicants have observed that there is a degree of entrainment of fine particle, or dust-like, torrified biomass with the removed inorganic process stream. The inorganic process stream with its entrained torrefied biomass content has value in its own right and may be used, for example, as a soil adjuvant for agricultural purposes. It may also be used as combustion fuel to provide thermal energy for processes which are tolerant to the inorganic ash content; a prime example in this instance being the energy required in a torrefication process and production of torrefied biomass.

The refined torrefied biomass of this disclosure has a reduced, after total combustion, inorganic content relative to crude biomass obtained from the green biomass and subjected to the same torrefaction process. Accordingly, the refined torrefied biomass disclosed herein has particular utility as the solid fuel in processes for the generation of energy by combustion of solid fuel. Its low inorganic content when used as solid fuel in this manner thus providing for a concomitant reduction in generation of inorganic ash.

The following examples are provided to illustrate certain features of disclosed embodiments. A person of ordinary skill in the art will appreciate that the invention is not limited to these examples.

EXAMPLE 1

Ponderosa Pine biomass from a tub grinder was collected from Oregon. The biomass was dried and torrefied. After torrefaction, the biomass was split into two fractions. One fraction was made into briquettes. The briquettes on combustion had a residual ash content of 6.1 weight percent. The second fraction was screened through a vibrating mesh sieve, 10 mesh (1.6 mm) screen. The material which did not pass through the screen was collected and made into briquettes. These briquettes on combustion had a residual ash content of 1.9%; corresponding to a reduction of approximately 70% in inorganic (ASTM Method T-211) matter.

EXAMPLE 2

Ponderosa Pine biomass from a tub grinder was collected from Oregon. The biomass was dried and torrefied. After torrefaction, the biomass was split into two fractions. One fraction was made into briquettes. The briquettes on combustion had a residual ash content of 6.1 weight percent. The second fraction was processed through an Air Density Separator having a screen size of 10 mesh. The size fraction which passed through the 10 mesh and the fine fraction which was recovered from the fluidizing air stream, on combustion had a residual ash content which represented 90% of the total ash in the feed. The mass fraction which contained 90% of the ash producing contaminants represented only 1% of the original feedstock. This indicates that a small amount of the fine particulate matter is actually a dust form of the torrefied biomass. It is desirable to remove such torrefied dust from the larger particulate torrefied biomass as it reduces safety concerns with the flammable dust in any subsequent processing or end use/combustion process.

The dust separated from the biomass including the non-combustible inorganic fraction as a result of the above describe separation process has significant calorific value. As such it may be combusted and the energy released used to partially supplant that required in the overall process for drying and torrefaction of the biomass. Of course, since the dust obtained from the dirt removal process also contains substantial inorganic matter, the combustion process must include a post combustion method to remove the fine particulate material. Such devices are well known in the industry and include bag filters cyclones or electrostatic precipitators.

The dust separated from the biomass, including the non-combustible inorganic fraction as a result of the above described separation process also has value as a humectant when blended with clay-like soils. The inorganic portion of the fraction contains minerals compatible with most soils and the porous torrefied biomass provides a material which can adsorb moisture over time, which moisture is available to plant material for healthy growth.

Although the subject invention has been described with respect to advantageous embodiments, those of ordinary skill in the art will readily appreciate that changes or modifications thereto may be made without departing from the spirit and scope of the subject invention as defined by the appended claims. In view of the many possible embodiments to which the principles of the disclosed processes may be applied, it should be recognized that the teachings herein are only examples and should not be taken as limiting the scope of the invention.

We claim:
1. A process for manufacturing refined torrefied biomass having a reduced inorganic content, comprising:
  producing a torrefied biomass; and passing the torrefied biomass through at least one selective separation device to separate inorganic particulate matter from the torrefied biomass to produce refined torrefied biomass.

2. The process of claim 1 wherein the device comprises a vibrating mesh sieve.

3. The process of claim 1 wherein the device comprises an air separator.

4. The process of claim 1 wherein the device comprises a cyclone.

5. The process of claim 1 wherein the device comprises an air knife.

6. The process of claim 1 wherein the device comprises a fluidized bed separator.

7. The process of claim 1 wherein, prior to passing the torrefied biomass through the selective separation device, the torrefied biomass is subjected to a comminuting process to confer an essentially uniform granulate particle size to the torrefied biomass.

8. The process of claim 7 wherein the comminuting process comprises subjecting the torrefied biomass to a pulverizing, triturating, milling or sonification treatment.

9. The process of claim 1 wherein the torrefied biomass comprises non-debarked forest wood and forestry debris.

10. The process according to claim 9, comprising passing granulate torrefied biomass comprising the non-debarked forest wood and forest debris through a fluidized bed separator to separate larger particle granulate torrefied biomass from smaller inorganic particles.

11. The process according to claim 1 further comprising compacting the refined torrefied biomass.

12. The process according to claim 11 further comprising using the torrefied biomass as a solid fuel to provide a concomitant reduction in generation of inorganic ash.

13. The method according to claim 1 further comprising briquetting the refined torrefied biomass.

14. The process according to claim 11 for reclaiming energy value of fine particulate biomass recovered from a dirt removal process, comprising:

combusting dirt-containing fine particulate biomass; and removing a non-combustible fraction subsequently from combustion products using a filter.

15. The process according to claim 11 for reclaiming economic value from dirt-containing fine particulate biomass, comprising:

preparing the compacted biomass material and recovering dirt-containing fine particulate biomass; and using the dirt-containing fine particulate biomass as a soil enhancement adjuvant for agricultural use.

16. A biomass product produced according to the method of claim 1.

17. The product according to claim 16 wherein the crude torrefied biomass comprises non-debarked forest wood and forest debris.

18. A compacted biomass product produced according to the method of claim 11.

19. A biomass briquette produced according to the process of claim 13.

20. The method according to claim 1 wherein the selective separation device is a vibrating mesh sieve, an air separator, a cyclone, an air knife or a fluidized bed separator.

21. A process for manufacturing refined torrefied biomass having a reduced inorganic content, comprising:

torrefying biomass to produce torrefied biomass;

comminuting the torrefied biomass by pulverizing, triturating, milling or sonification to produce a uniform torrefied biomass having an essentially uniform granulate particle; and passing the uniform torrefied biomass through at least one selective separation device selected from the group consisting of a vibrating mesh sieve, an air separator, a cyclone, an air knife or a fluidized bed separator to separate inorganic particulate matter from the torrefied biomass to produce refined torrefied biomass.

* * * * *